United States Patent Office 3,541,123
Patented Nov. 17, 1970

---

3,541,123
PROCESS FOR THE FRACTIONATION OF OILS AND FATS
Tsukasa Kawada and Nobuya Matsui, Tokyo, Japan, assignors to Kao Soap Co., Ltd., Tokyo, Japan, a corporation of Japan
No Drawing. Filed Oct. 21, 1968, Ser. No. 769,414
Int. Cl. C11b 7/00
U.S. Cl. 260—428.5   1 Claim

ABSTRACT OF THE DISCLOSURE

A process for fractionating oils and fats in which the oil or fat is dissolved in 1-nitropropane, 2-nitropropane or mixtures thereof, following which a first fraction is obtained by crystallization at 10–18° C. and a second fraction is obtained by crystallization at 3–5° C. The second fraction being rich in β-oleodisaturated glycerides and being useable as a cacao butter substitute.

BACKGROUND OF THE INVENTION

Field of the invention

This invention relates to a process for separating, by a solvent fractionation process, a fraction rich in a disaturated monounsaturated glyceride of a particular type represented by β-oleodistearin, from an oil or a fat which is comprised of a mixed glyceride system.

More particularly, the present invention makes it possible to provide a glyceride composition which can be advantageously used as a substitute for cacao butter. According to the present invention there is obtained a fraction rich in a disaturated monounsaturated glyceride having an unsaturated acid in its β-position. This glyceride also forms the greater part of the glyceride composition of a cacao butter. Thus, said fraction can be used as a cacao butter substitute.

Description of the prior art

In generally used natural oils and fats, except special cases, the disaturated monounsaturated glyceride component is a mixture of SOS (β-oleodistearin) and OSS (α-oleodistearin), wherein S represents a saturated fatty acid and O represents an unsaturated fatty acid, which consists mostly of oleic acid. It is known that the greater part, usually 73 to 83% by weight, of the glyceride composition of a cacao butter is monooleodisaturated glycerides (T. P. Hilditch: The Chemical Constitution of Natural Fats, 3rd Edition, 1956, John Wiley & Sons Inc., page 351) and that the greater part thereof is of the SOS type. Further, it is known that the excellent properties which characterize cacao butter for its commercial and industrial uses, such as smooth melting in the mouth, narrow melting point range and moldability, are derived from said β-oleodistearin type monooleodisaturated glyceride.

The glyceride compositions and the fatty acid compositions of disaturated monounsaturated glycerides in the various oils and fats named below, measured according to the method of Jurriens, De Vries and Schouten [J. Lipid Res. 5, 366 (1964)], are as follows:

TABLE 1.—GLYCERIDE COMPOSITIONS IN MOL PERCENT

| | Oils and fats | | | |
|---|---|---|---|---|
| Glycerides | Beef tallow | Mutton tallow | Hardened palm oil | Cacao butter |
| $S_3$ | 13.8 | 18.0 | 3.9 | 1.9 |
| $S_2O$ | 43.3 | 47.1 | 39.8 | 77.1 |
| $S_2L+SO_2{}^1$ | 26.9 | 24.3 | 32.0 | 16.5 |
| $O_3$ and other components | 16.0 | 10.6 | 24.3 | 4.5 |

[1] L represents an unsaturated fatty acid of the linolic acid or linolenic acid series.

TABLE 2.—FATTY ACID COMPOSITIONS IN MOL PERCENT IN β-POSITIONS OF $S_2O$ GLYCERIDES

| | Oils and fats | | | |
|---|---|---|---|---|
| Glycerides | Beef tallow | Mutton tallow | Hardened palm oil | Cacao butter |
| Fatty acids | | | | |
| $C_{12}$ | 2.0 | 2.1 | 1.2 | |
| $C_{14}$ | 4.3 | 3.7 | 1.3 | 0.6 |
| $C_{16}$ | 27.8 | 22.8 | 26.8 | 3.0 |
| $C_{16}$—F— | 3.3 | 2.4 | | |
| $C_{18}$ | 19.7 | 22.4 | 0.7 | 2.4 |
| $C_{18}$—F— | 42.9 | 46.6 | 68.2 | 94.0 |
| SOS/SOS+OSS | 0.462 | 0.490 | 0.682 | 0.94 |

NOTE: "—F—" indicates one double bond (SOS type). Thus, $C_{18}$ —F— indicates an unsaturated fatty acid having 16 carbon atoms and one double bond.

It is conventionally known to divide an oil or fat into several glyceride fractions having different physical properties by subjecting it to a solvent fractionation process. In such a process, the oil or fat will be fractionated to obtain a first fraction comprised substantially of trisaturated glycerides, a second fraction comprised substantially of a mixture of disaturated monounsaturated glycerides and monosaturated diunsaturated glycerides and a third fraction comprised substantially of a mixture of the remaining monosaturated diunsaturated glycerides and all the unsaturated glycerides. However, in such a conventional process, a fraction rich in β-oleodistearin glycerides is difficult to obtain.

SUMMARY OF THE INVENTION

According to the present invention, the solvent fractionation process is carried out so as to remove a first fraction comprised substantially of the ($S_3$+OSS) glycerides in the first fractionation step and to obtain a second fraction containing the SOS glyceride component in a concentrated state in the second fractionation step.

Further, in the process of this invention, 1-nitropropane or 2-nitropropane or a mixture of them, should be used as the solvent in order to obtain a second fraction rich in β-oleodistearin-type glycerides. The weight of solvent used is 1.5 to 5 times as large as of the weight of the oil or fat fractionated in order to obtain a favorable result. An excess of the solvent will reduce the yield of SOS in the obtained second fraction.

The process of the present invention consists of a first step wherein an oil or fat containing β-oleodisaturated glycerides as part of its disaturated monounsaturated glyceride component, such as, for example, beef tallow, mutton tallow, palm oil and their slightly hydrogenated oils and fats, is dissolved in the above mentioned special solvent, the solution is cooled to a temperature of 10 to 18° C. while the solution is stirred slowly and the deposited crystals are filtered so as to be obtained as a first fraction. Then, there is carried out a second step in which the filtrate of the first step is further cooled to a temperature of 3 to 5° C. while it is stirred and the deposited crystals are filtered so as to be obtained as a second fraction. Thereafter an additional step or a third step is carried out in which the solvent is driven out of the first and second fractions as well as the filtrate of the second step. By this process, a fraction having a high weight ratio of SOS can be obtained as the second fraction.

DESCRIPTION OF THE PREFERRED EMBODIMENTS

Example 1.—A deacidified and decolorized refined mutton tallow (of an acid value of 0.3, saponification value of 195, iodine value of 42.7 and melting point of 45° C.) was dissolved at a ratio of 3 cc./g. in each of the three kinds of solvents listed in the following table, the solution was cooled to 10 to 11° C. and crystals were obtained as a first fraction. Then the filtrate was cooled to 3 to 4° C. and crystals were obtained as a second fraction. The results are listed in Tables 3, 4 and 5.

were deposited while the solution was slowly stirred. The crystals were separated by filtration to obtain a second fraction. The results are shown in Table 6.

TABLE 6

| Experiment No. | Solvents | Ratio of solvent to oil in cc./g. | Fraction number | Yield in percent by weight | Iodine value | Glyceride composition in mol percent | | | |
|---|---|---|---|---|---|---|---|---|---|
| | | | | | | $S_3$ | $S_2O$ | $SO_2 \cdot S_2L$ | $O_3$ |
| 1 | 1-nitropropane | 10 | 1 | 28.7 | 23.7 | 2.1 | 79.1 | 11.0 | 7.8 |
| | | | 2 | 29.9 | 37.9 | | | | |
| | | | 3 | 40.4 | 60.9 | | | | |
| 2 | 1-nitropropane | 7.5 | 1 | 28.9 | 23.7 | 0.8 | 76.5 | 15.2 | 7.5 |
| | | | 2 | 27.9 | 36.2 | | | | |
| | | | 3 | 43.7 | 58.2 | | | | |
| 3 | 1-nitropropane | 3 | 1 | 35.0 | 24.2 | 0.8 | 75.6 | 16.3 | 7.3 |
| | | | 2 | 26.7 | 38.6 | | | | |
| | | | 3 | 39.3 | 58.6 | | | | |
| 4 | Acetone | 10 | 1 | 24.6 | 15.5 | 5.9 | 75.7 | 12.3 | 6.1 |
| | | | 2 | 35.1 | 36.8 | | | | |
| | | | 3 | 39.7 | 59.2 | | | | |
| 5 | Acetone | 7.5 | 1 | 25.7 | 15.7 | 2.7 | 77.8 | 12.3 | 4.2 |
| | | | 2 | 32.1 | 36.6 | | | | |
| | | | 3 | 41.7 | 58.2 | | | | |
| 6 | Acetone | 3 | 1 | 35.7 | 22.4 | 5.7 | 72.2 | 13.8 | 8.3 |
| | | | 2 | 32.0 | 40.4 | | | | |
| | | | 3 | 32.9 | 61.4 | | | | |

TABLE 3

| Solvents | First fraction | | Second fraction | |
|---|---|---|---|---|
| | Yield (mol percent) | Iodine value | Yield (mol percent) | Iodine value |
| 2-nitropropane | 32.7 | 21.5 | 33.5 | 24.5 |
| Acetone | 20.5 | 37.5 | 30.2 | 38.5 |
| n-Hexane | 34.3 | 20.7 | 28.5 | 39.4 |

TABLE 4.—GLYCERIDE COMPOSITION IN THE SECOND FRACTIONS IN TABLE 3 (MOL PERCENT)

| Solvents | Glycerides | | | |
|---|---|---|---|---|
| | $S_3$ | $S_2O$ | $S_2L \cdot SO_2$ | $O_3$ |
| 2-nitropropane | 1.8 | 77.7 | 11.5 | 9.0 |
| Acetone | 2.4 | 69.3 | 14.4 | 13.9 |
| n-Hexane | 2.2 | 75.8 | 13.5 | 8.5 |

The compositions of the fatty acids in the β-positions of the $S_2O$ glycerides and the quantative ratios of SOS glycerides in the $S_2O$ glycerides (SOS/SOS+OSS) in the first and second fractions shown in Table 3 were measured. The results are as follows:

TABLE 5

| Solvents | Fraction number | Mol percent | | | | | | SOS/SOS+OSS |
|---|---|---|---|---|---|---|---|---|
| | | $C_{12}$ | $C_{14}$ | $C_{16}$ | $C_{16}$—F— | $C_{18}$ | $C_{18}$—F— | |
| 2-nitropropane | 1 | 0.5 | 4.3 | 23.4 | 2.7 | 30.8 | 38.3 | 0.410 |
| | 2 | 0.8 | 2.5 | 13.3 | 3.0 | 16.3 | 64.1 | 0.671 |
| Acetone | 1 | 0.3 | 1.7 | 16.1 | 2.5 | 30.8 | 48.6 | 0.511 |
| | 2 | 3.0 | 3.6 | 14.3 | 3.0 | 20.0 | 56.1 | 0.591 |
| n-Hexane | 1 | 0.9 | 2.1 | 17.5 | 2.8 | 30.2 | 46.5 | 0.493 |
| | 2 | 1.7 | 3.0 | 18.2 | 4.4 | 22.2 | 52.5 | 0.549 |

It is evident from Table 5 that, when 2-nitropropane was used as the solvent, the ratio of SOS in the second fraction showed the best value.

Example 2.—Solutions of the refined mutton fat described in Example 1 were made using the solvents listed in Table 6 and at the respective solvent ratios listed in Table 6. Crystals were deposited from each of the solutions while the same were slowly stirred at 18° C. The crystals were separated by filtration after 30 minutes to obtain a first fraction. (As an exception, in experiments Nos. 3 and 6, the separations were made by crystallization at 10° C. for 10 minutes.) The filtrate was cooled to 5° C., was kept at this temperature for 1 hour and crystals The fatty acid compositions in the β-positions of $S_2O$ parts in the second fraction obtained in the experiments shown in the above table and the SOS yields (SOS/SOS+OSS)

calculated from them are listed in Table 7.

TABLE 7

| Experiment No. | Mol percent | | | | | | SOS/SOS+OSS |
|---|---|---|---|---|---|---|---|
| | $C_{12}$ | $C_{14}$ | $C_{16}$ | $C_{16}$—F— | $C_{18}$ | $C_{18}$—F— | |
| 1 | 0.6 | 2.1 | 22.4 | 1.1 | 30.5 | 43.3 | 0.444 |
| 2 | 1.9 | 2.7 | 19.4 | 2.5 | 19.7 | 53.8 | 0.563 |
| 3 | 0.5 | 2.2 | 13.3 | 2.7 | 15.4 | 65.9 | 0.686 |
| 4 | 1.0 | 5.8 | 20.0 | 0.2 | 25.0 | 48.0 | 0.482 |
| 5 | 0.4 | 2.3 | 18.0 | 1.9 | 26.9 | 50.5 | 0.524 |
| 6 | 1.1 | 5.8 | 20.9 | 0.7 | 21.4 | 50.1 | 0.508 |

Example 3.—A hardened palm oil slightly hydrogenated to have an iodine value of 420 was dissolved in 2-nitropropane at a solvent ratio of 3 cc./g. of the oil, a first fraction was obtained by crystallization at 15° C. and a second fraction was obtained by crystallization at 5° C. from the filtrate as in the previously described examples. The results are listed in Table 8.

TABLE 8

| | Iodine value | Fatty acid in the β-position in percent by weight | | | | |
|---|---|---|---|---|---|---|
| | | $C_{12}$ | $C_{14}$ | $C_{16}$ | $C_{18}$ | $C_{18}$—F— |
| First fraction | 17.1 | | | | | |
| Second fraction | 34.8 | 1.4 | 1.1 | 17.2 | 1.1 | 79.2 |

The embodiment of the invention in which an exclusive property or privilege is claimed is defined as follows:

1. A process for fractionating oils and fats by a solvent crystallization and fractionation process, which comprises dissolving an oil or a fat selected from the group consisting of tallow, mutton fat, palm oil and their slightly hydrogenated oils and fats containing β-oleodisaturated glycerides in its disaturated monounsaturated glyceride component in a solvent selected from the group consisting of 1-nitropropane, 2-nitropropane and mixtures thereof, the weight of the solvent used being 1.5 to 5 times as large as the weight of the oil or fat, cooling the solution to a temperature of 10 to 18° C. and separating from the solution a first crystal fraction, and then cooling the remaining solution to a temperature of 3 to 5° C. to obtain a second crystal fraction which is rich in β-oleodisaturated glycerides.

References Cited

UNITED STATES PATENTS 3,345,389  10/1967  Zilch _____ 260—419

LEWIS GOTTS, Primary Examiner

E. G. LOVE, Assistant Examiner

U.S. Cl. X.R.

99—118; 260—410.7